Patented June 22, 1943

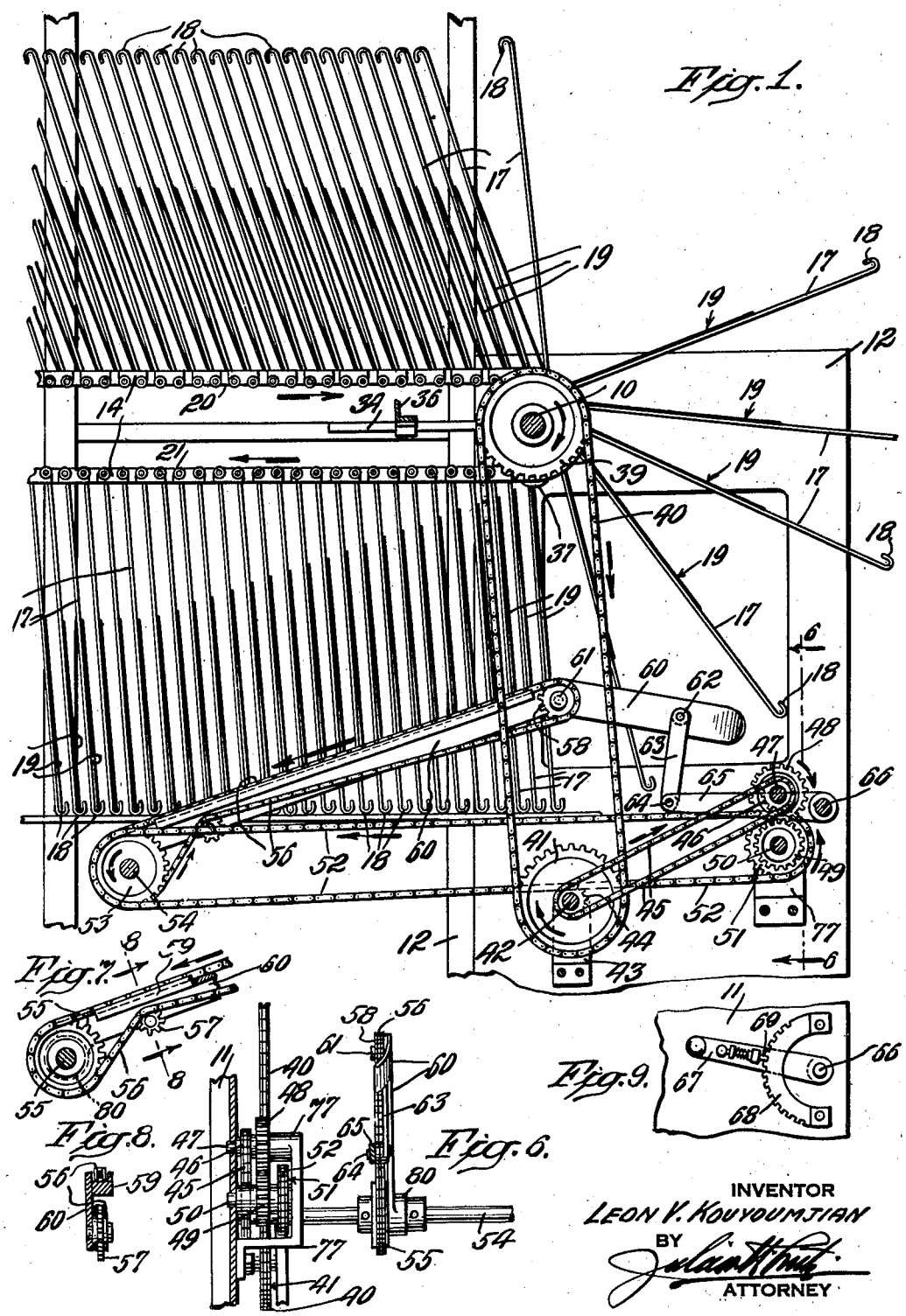

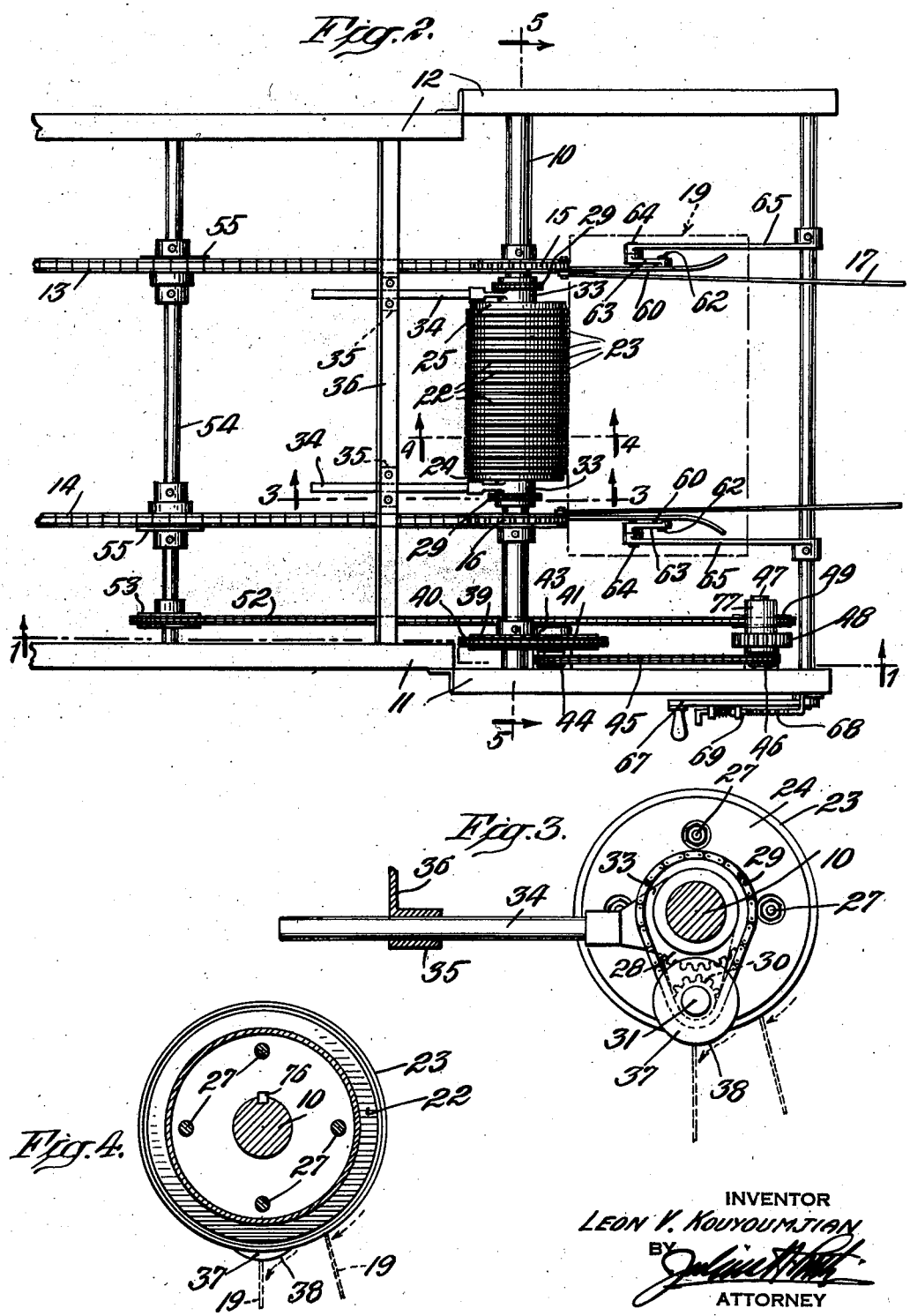

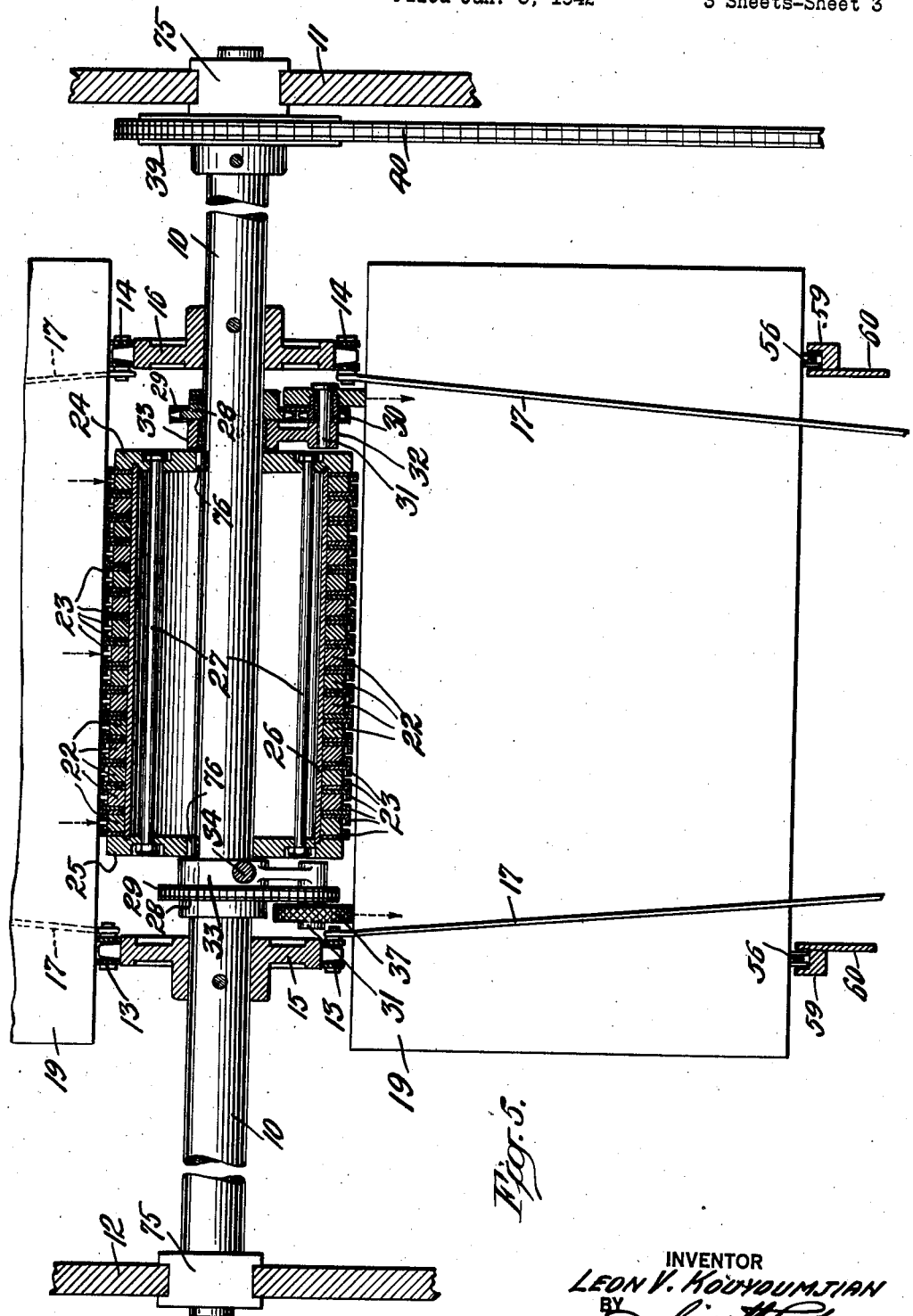

2,322,299

UNITED STATES PATENT OFFICE 2,322,299

CONVEYER FOR DRYING OVENS

Leon V. Kouyoumjian, Fairview, N. J., assignor to National-Standard Company, a corporation of Michigan Application January 3, 1942, Serial No. 425,527

8 Claims. (Cl. 198—41)

This invention relates to conveying means for employment in a drying oven of the kind in which a plurality of varnished or lacquered plates are carried to cause the drying of the varnished or lacquered surfaces thereof.

In a structure of this character the conveying means usually consists of several spaced chains extending over sprockets, and the plates are carried and supported by the chains and wire racks thereon. At one end of the oven the conveyer chains extend over a rotating shaft and the plates, when moved from the top stretch of the chains to the lower stretch thereof, usually tend to slide radially and away from the shaft. This causes the plates to impinge against retaining elements provided on the ends of the racks so that the edges of the plates, coming forcibly into contact with said retaining elements, are likely to be damaged.

In the present invention means is provided by which the plates on the conveyer, and particularly those adjacent the shaft above described, are held against the objectionable radial shifting movement so that the transition of the plates from the upper stretch of the chain conveyer to the lower stretch thereof, is smoothly performed and the plates securely held against such shifting movement while the transition is taking place.

The primary object therefore, of the present invention is to provide means by which the plates held by the conveyer may be carried around the end of the conveyer from an uppermost to a lowermost position thereon, without radial shift or displacement of the plates, and solely by engagement of the edges only of the plates so that the finish on said plates is not likely to be marred.

More particularly, the invention contemplates the provision of a cylindrical magnet rotatively mounted and caused to magnetically engage the edges of the plates on the conveyer at a point in the movement of the conveyer wherein the same begins to transfer the plates from an uppermost to a lowermost position, and to hold said plates against movement radially of said magnet until the plates so engaged have reached a lowered position; the invention also including means for breaking the magnetic engagement of the plates at a proper point, and in means whereby the released plates may be gradually lowered into engagement with retaining means provided on the wire racks for their reception.

These and other objects are accomplished by the structure, a more particular description of which is set forth hereinafter and more particularly pointed out in the claims appended hereto.

In the accompanying drawings forming a part hereof, Fig. 1 is a side elevation, with parts in section, of one end of the conveying means showing the means for holding the plates against radial shifting movement and for lowering said plates into position in the retaining members of the racks; Fig. 2 is a plan view of the structure; Fig. 3 is a sectional view on the line 3—3 of Fig. 2, looking in the direction of the arrows; Fig. 4 is a sectional view through the magnetic roller on the line 4—4 of Fig. 2, looking in the direction of the arrows; Fig. 5 is a sectional view on the line 5—5 of Fig. 2, looking in the direction of the arrows; Fig. 6 is a sectional view on the line 6—6 of Fig. 1, looking in the direction of the arrows; Fig. 7 is a view of a portion of one of the chains in the supplemental conveying and supporting means that is employed for lowering the plates into the retaining hooks on the racks; Fig. 8 is a sectional view on the line 8—8 of Fig. 7, looking in the direction of the arrows; and Fig. 9 is a front elevation of the adjusting mechanism for the supplemental conveying and plate-supporting means.

With reference to the structure disclosed in Figs. 1 and 2, 10 indicates a shaft located within the oven and adjacent to one end thereof and forming a part of the plate-conveying means. Said shaft is rotatably supported in suitable bearings 75 in the side frames 11 and 12 of the frame of the conveyer. The shaft 10 is rotated by means of the lengthy conveyer chains 13 and 14 which are driven by suitable mechanism at the front end of the machine, not shown, said chains being moved in the direction of the arrows shown in the central portion of Fig. 1. The chain 13 extends around the sprocket 15 (Fig. 2) and the chain 14 extends over the sprocket 16, both of the sprockets 15 and 16 being fixed upon and rotating the shaft 10. Each of the chains 13 and 14 carries a plurality of vertically disposed wire racks 17, said racks being secured to the slides of the links of the chain, in a manner well known in this art. Each rack has its outer or free end terminating in a laterally bent hook or plate-retaining member 18, these hooked ends being adapted to hold plate 19, when the plates rest in these hooked portions 18 along the lower stretch of the conveyer, as indicated in the lower portion of Fig. 1. When the plates are supported edgewisely upon the upper stretch 20 of the chains, as indicated in Fig. 1, the plates incline slightly toward the wire racks 17 as therein shown. Upon reaching the end of the conveyer where the shaft 10 is located, the wire racks swing downwardly and carry the plates with them until the lower stretch 21 of the conveyer is reached. In this portion of the conveyer the plates descend by gravity away from the lower stretch of the chains 13 and 14 and then are supported by the hooked ends 18 of the racks 17. It is desirable that during the transfer of the plates from the upper stretch of the conveyer to the lower stretch thereof, the plates shall be prevented from sliding radially away from the periphery of the shaft 10 and with this end in view, magnetic means is provided for magnetically engaging the inner edges of the plates and holding the plates against outward radial sliding movement. The magnetic means just referred to is shown in detail in Figs. 2, 4 and 5, the same consisting of a cylinder composed of a plurality of annular permaent magnets 22 held in spaced relation by soft iron spacing rings 23, said rings being separated from one another by the magnets, and the rings 23 and magnets 22 being clamped together to form a cylinder by means of end discs 24 and 25. The discs 24 and 25, magnets 22, rings 23 and an internal sleeve 26 are all held together by means of a plurality of lengthy tie-bolts 27. The cylindrical magnet so formed is keyed upon the shaft 10 as indicated at 76 in Fig. 4 and is thus rotated with the shaft.

Secured on the shaft 10 at each end of the cylindrical magnet is a sprocket 28 over which a chain 29 extends, said chain passing around and driving a sprocket 30 rotatably mounted on a pin 31 secured in the arm 32 of a hanger 33 which surrounds the shaft 10 but is free thereon so that the shaft 10 rotates freely within the hanger. The hanger is restrained from rotative or swinging movement by means of a projecting rod or stem 34 held in a clamp 35 secured to the under side of the cross-bar 36 of the frame. Secured on the hub of sprocket 30, and therefore rotatable with the sprocket, is a roll 37 having a knurled periphery, as seen at the left in Fig. 5. It will be noted in Figs. 1 and 3 that the periphery of each of the two rolls 37 extends below the periphery of the cylindrical magnet as indicated at 38 in Figs. 3 and 4.

Rotation of the shaft 10 thus causes rotation of the two rolls 37, and as the plates 19, magnetically adherent to the magnet, are carried around the shaft 10, their edges are brought into contact with the projecting portions 38 of the rolls 37 so that the magnetic connection between the plates and the magnet is broken, and the plates are caused to descend upon inclined chains now to be described.

At one of its ends, shaft 10 carries a sprocket 39 around which a chain 40 extends, said chain extending around a sprocket 41 on a short shaft 42 rotative in bearing 43 attached to the side frame 11. Also secured on the short shaft 42 is a small sprocket 44 around which a chain 45 extends, said chain extending around a sprocket 46 rotative on shaft 47 secured in bracket 77. Sprocket 46 is attached to a gear 48 which meshes with and drives a similar gear 49 on rotative shaft 50, also secured in bracket 77, said gear 49 being attached to a sprocket 51, around which chain 52 extends. Chain 52 passes around a remotely located sprocket 53 secured on a cross-shaft 54, said shaft being rotatively mounted in the side frames 11 and 12 of the machine. Secured on the shaft 54 directly below the conveyer chains 13 and 14 is a pair of spaced sprockets 55, one of which is shown in Fig. 7. A chain 56 extends around each of these sprockets, said chain extending over an idler 57 and around a sprocket 58. There are two of these chains connected as above described, and the upper stretch of each of these chains is supported in a channel bar 59 secured to an angular arm 60 having a hub portion 80 at one end which surrounds and is loosely supported on the shaft 54. The sprocket 58 is rotatively mounted upon pin 61 near the opposite end of arm 60. Near said opposite end which is outwardly bent, the arm 60 is connected at 62 to a short link 63 having its opposite end attached at 64 to a lever 65, secured on a shaft 66 extending across the apparatus and adapted for manual pivotal movement to adjust the angular inclination of the upper stretches of the chains 56.

As the plates 19, magnetically adherent to the cylindrical magnet, are carried around the end of the conveyer and over the shaft 10, and reach a point where they are brought into contact with the rolls 37 which strip them from the magnet, the lower edges of these plates come to rest upon the upper stretches of the two inclined chains 56. These chains act as a supplemental conveyer and the plates are carried gradually downward by them, as indicated by the arrow in Fig. 1, until each of the plates is brought to rest in the hooked ends 18 of a pair of wire racks. In other words, through the mechanism described, the descent of the plates from the point of stripping from the magnetic roll is gradual and the plates are gently brought to rest in the hooked ends of the racks instead of being permitted to drop thereinto.

In order to compensate for plates of various widths, means is provided for regulating the angularity of the two chains 56. This is done by manually rotating the shaft 66 to any required extent to cause the chains 56 to be elevated or lowered through link mechanism consisting of the elements 60, 63 and 65. The adjusting mechanism for shaft 66 will be clearly seen in Figs. 2 and 9. There it will be noted that a handle or crank 67 is secured at one end to shaft 66 so that by movement of the handle the shaft may be rotated to the extent required. To hold the shaft 66 in any desired position of adjustment, a notched quadrant 68 is provided on the frame portion 11 and the handle 67 carries a spring-pressed dog 69 for engagement with any suitable notch. It will be obvious from the foregoing, that by manipulation of the handle 67, the angularity of the supplemental conveyer, consisting of the two chains 56 and associated parts, may be regulated to enable plates of various widths to be gently lowered into the hooked ends 18 of the racks after the plates have been stripped from the cylindrical magnets.

Briefly, the operation of the apparatus is as follows: The plates are loaded in the conveyer at its front end, not shown, and proceed along on the upper stretch 20 of the conveyer until they reach the shaft 10, around which they are carried by the racks to reach the lower stretch of the conveyer. As the plates reach a point above the cylindrical magnet, their lower edges are magnetically engaged by the magnet and held thereby, and prevented from radial shifting movement until they reach the lower stretch of the conveyer. At this point, the plates come into contact with the peripheral portion 38 of the rolls 37 which strip the plates from the magnet. The plates now supported by their lower edges on the inclined chains 56 gradually descend until they are resting in the hooked ends 18 of the racks 17 in the lower stretch of the conveyer, wherein they are carried until they again reach the front end of the machine.

What I claim is:

1. In an apparatus of the character described, a conveyer upon which a plurality of metallic plates are supported on edge, said conveyer including a rotating shaft around which the plates are carried, racks on the conveyer between which the plates are disposed, and magnetic means on said shaft for magnetically engaging the edges only of the plates and holding said plates against radial sliding movement over the racks while said plates are moved through a portion of each revolution of the shaft.

2. In an apparatus of the character described, a chain conveyer, a shaft over which said conveyer extends and which causes rotative movement of the shaft, racks on said conveyer for supporting plates edgewisely on the conveyer, lateral extensions on the ends of said racks, a magnetic cylinder secured on and rotatable with the shaft whereby plates carried by the conveyer and about the shaft will have their edges magnetically engaged by the cylinder and be thereby restrained from movement in a direction away from the shaft, means for causing the plates to be disengaged from the magnetic cylinder at a predetermined point in each rotation of the roll, and means for supporting the disengaged plates and gradually lowering the same into engagement with the lateral extensions on the racks.

3. In an apparatus of the character described, a rotated shaft around which a plurality of metallic plates are carried with the edges thereof directed toward the shaft, said shaft being provided with a magnetic cylinder whereby the edges of the plates will be attracted thereby and held magnetically attached to said cylinder during a part of each revolution of the shaft, and means in the path of movement of the magnetically attached plates for engaging the edges of said plates and stripping the same from the cylinder.

4. In an apparatus of the character described, a rotated shaft around which a plurality of metallic plates are carried with the edges thereof directed toward the shaft, said shaft being provided with a magnetic cylinder whereby the edges of the plates will be attached thereby and held magnetically attached to said cylinder during a part of each revolution of the shaft, means in the path of movement of the magnetically attached plates for engaging the edges of said plates and stripping the same from the cylinder, and means for supporting the edges of the plates when the same are stripped from the cylinder and gradually lowering said plates.

5. In an apparatus of the character described, a rotated shaft around which a plurality of metallic plates are carried with the edges thereof directed toward the shaft, said shaft being provided with a magnetic cylinder whereby the edges of the plates will be attracted thereby and held magnetically attached to said cylinder during a part of each revolution of the shaft, rollers adjacent said cylinder having their peripheries extending beyond the periphery of the cylinder for engaging the edges of the plates while the said plates are magnetically attached to the cylinder and stripping the plates from the cylinder, and means for rotating said rollers.

6. In an apparatus of the character described, a chain conveyer having upper and lower stretches, said chain conveyer having racks attached to the same, said racks having off-set end portions for supporting metallic plates when the plates are located in the lower stretch of the conveyer, a sprocket-carrying shaft around which the chain conveyer extends, a cylindrical magnet on said shaft adapted to magnetically engage the edges of the plates and hold the same when said plates are carried around the shaft to the lower stretch of the conveyer, means for separating said plates from the magnet when said plates are located in the lower stretch of the conveyer, and plate-lowering means for supporting the plates when the same are separated from the magnet and gradually lowering said plates into engagement with the off-set end portions of the racks.

7. In an appratus of the character described, a chain conveyer, a shaft at one end of the same around which the conveyer extends, racks on the chain conveyer for supporting metallic plates, hooks on the ends of said racks, a roll in the form of a permanent magnet provided on the shaft for magnetic engagement with the edges of plates carried by the racks around the shaft, stripper rolls at the ends of the magnet for stripping the plates from the magnet, said stripper rolls having their peripheries projecting beyond the periphery of the magnet, means driven from the shaft for rotating said stripper rolls, inclined supporting means disposed below the magnet for supporting the plates when the same are stripped from the magnet, means for moving said supporting means in a direction away from the magnet whereby said supporting means will gradually lower the plates supported by it into the hooks on the ends of the racks, and means by which the angularity of said supporting means is adjusted.

8. In an apparatus of the character described, chain conveying means upon which a plurality of plates are supported, a rotative shaft around which said chain conveying means extends, racks carried by said conveying means, hooks formed at the ends of said racks, a magnetic roller mounted on the shaft and rotative therewith to engage the edges of plates carried around the shaft during rotation of the shaft, rollers having surfaces extending beyond the magnetic roller for breaking the magnetic engagement of said magnetic roller with the plates at a predetermined point in the rotative movement of the magnetic roller, and inclined chains for supporting the plates so released and gradually lowering the same into a position of engagement by the hooks on the racks.

LEON V. KOUYOUMJIAN.